March 17, 1953   R. M. STEVENS   2,631,731
ICE REMOVAL DEVICE
Filed June 21, 1949   3 Sheets-Sheet 1
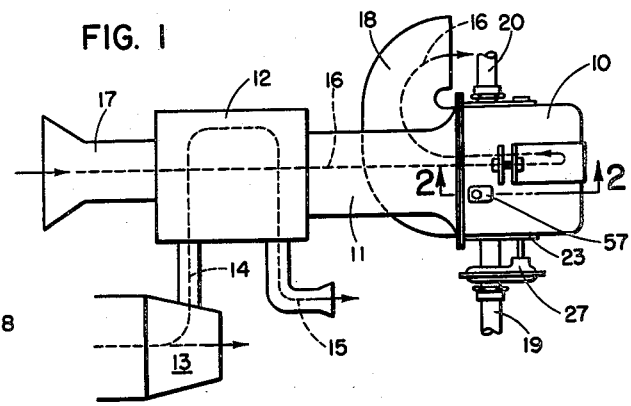
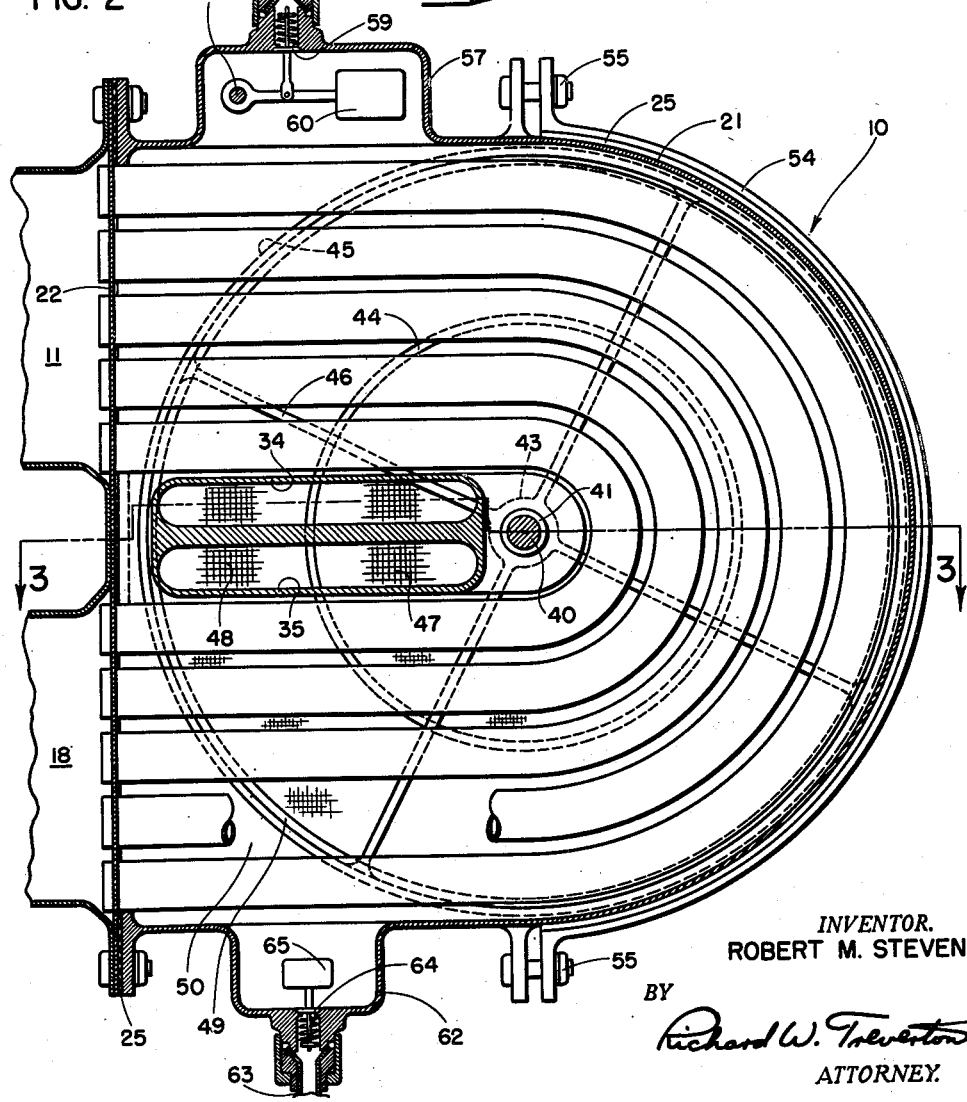
INVENTOR.
ROBERT M. STEVENS
BY
Richard W. Treverton
ATTORNEY.

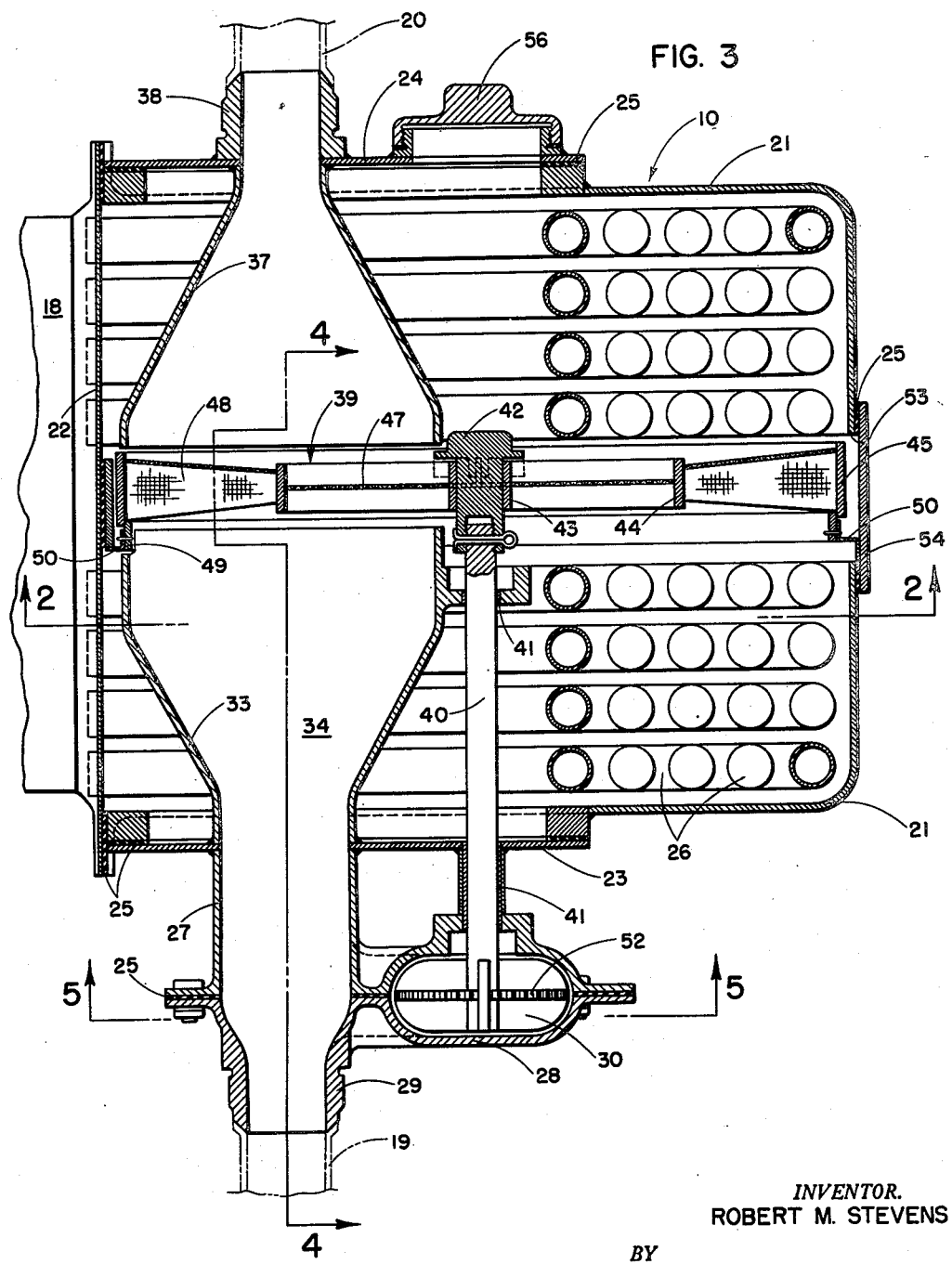

March 17, 1953 R. M. STEVENS 2,631,731
ICE REMOVAL DEVICE

Filed June 21, 1949 3 Sheets-Sheet 3

INVENTOR.
ROBERT M. STEVENS
BY
Richard W. Treverton
ATTORNEY.

Patented Mar. 17, 1953

2,631,731

UNITED STATES PATENT OFFICE 2,631,731

ICE REMOVAL DEVICE

Robert M. Stevens, Columbus, Ohio, assignor to Curtiss-Wright Corporation, a corporation of Delaware Application June 21, 1949, Serial No. 100,430

4 Claims. (Cl. 210—150.5)

1

The present invention relates to a device for removing ice and like matter from a fluid stream, for example from the fuel supply system of an aircraft engine.

At temperatures below freezing, water entrained in such a fuel system forms ice crystals which accumulate on and clog the filter or other region of restriction of the system, requiring the opening of a by-pass around the filter so that the effectiveness of the latter is destroyed and foreign matter is allowed to pass freely through the system to the engine. To avoid this difficulty it has been proposed to inject alcohol into the system for deicing the filter, but this has the disadvantage that in order to be effective the alcohol supply system must be relatively large and heavy, thus subtracting materially from the pay load of the aircraft. Deicing by means of heat applied to the filter in the fluid stream is impractical due to the large amount of heat required to raise above the freezing point the temperature of all fluid passing the filter.

The present invention contemplates a system wherein the deicing medium, whether heat or a deicing fluid such as alcohol, is applied only to ice which has been accumulated on a screen and then removed from the fluid stream. In this way the deicing medium is utilized with much greater efficiency, and the equipment for supplying it to the screen can be correspondingly smaller and lighter in weight than in the case of the systems heretofore proposed.

According to the invention a movable screen of mesh fine enough to collect the ice particles is arranged in the main fluid passage, the fluid stream being directed through only a part of the screen. Upon that part becoming clogged with ice, the screen is automatically moved to bring a different part thereof into the path of the fluid, and the clogged portion is deiced while it is removed from the stream. A rotatable screen is preferably employed, and its rotation is effected by an impeller that is arranged in a restricted fluid by-passage around the screen. The impeller is rotated by flow through the by-passage which occurs only when the part of the screen in the main fluid passage is clogged.

The invention contemplates, as a means for restricting flow through the by-passage, a loaded valve which opens only when icing of the screen is sufficient to effect a predetermined pressure drop across the screen. This valve is employed to operate means for holding the screen against unwanted rotation, the holding means being released only when the valve opens.

2

Deicing of the screen may be effected in various ways. However heating is preferred, this being accomplished conveniently by disposing the portion of the screen that is removed from the fluid stream in a compartment which contains a body of substantially static fluid whose temperature is elevated above freezing by heating elements also disposed in the compartment. These elements may comprise tubes through which heated air or other heating fluid is circulated.

The aforementioned and other objects and advantages will become apparent from the following description of a preferred embodiment of the invention shown in the accompanying drawings, wherein:

Fig. 1 is a schematic plan view of a system employing the ice removal device of the present invention;

Fig. 2 is a vertical section through the device taken on line 2—2 of Figs. 1 and 3;

Fig. 3 is a plan sectional view taken along line 3—3 of Fig. 2;

Figure 5:
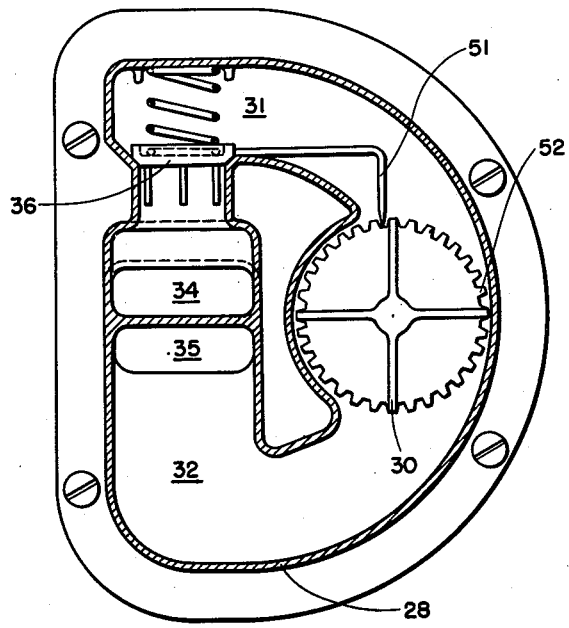
Fig. 5 is a sectional view taken along line 5—5 of Fig. 3.

The ice removal unit as a whole is indicated by the numeral 10, and as shown in Fig. 1 it may be connected by a duct 11 with a heat exchanger 12 which is arranged to receive hot exhaust gases from the tailpipe 13 of an internal combustion engine. These gasses pass, as indicated by dotted line 14, from the engine tailpipe through heating fluid passages in the exchanger and then exhaust from the latter through an exhaust pipe 15. The path of heating air for the ice removal unit is indicated by dotted line 16, this air entering the heated fluid passages of the heat exchanger from an inlet duct 17, and passing from the exchanger through duct 11 into unit 10. From the latter it exhausts through a duct 18. Liquid fuel for the engine enters the unit 10 from a fuel inlet line 19 and is discharged from the unit to the engine through a fuel outlet line 20.

Figure 4:
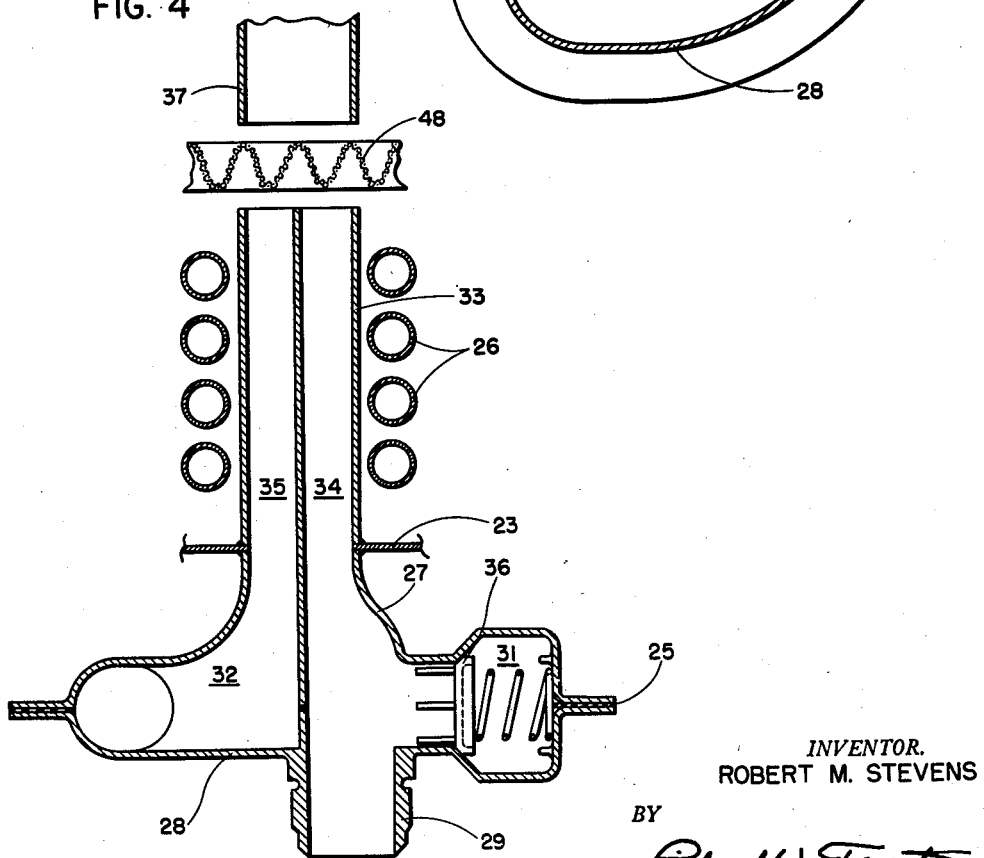
Fig. 4 is a fragmentary sectional view taken along line 4—4 of Fig. 3.

The ice removal unit 10 comprises a main casing section 21 having secured thereto a front plate 22 and side plates 23 and 24, suitable gaskets 25 being interposed between these and various other parts of the unit 10. Brazed or otherwise secured in fluid-tight relation to the front plate 22 and extending around the interior of the casing are a plurality of U-shaped heating tubes 26. The opposite ends of these tubes open respectively into duct 11 and duct 18, so that heated air from duct 11 traverses the tubes before discharging into duct 18. Rigidly secured to the outer face of side plate 23 is a member 27 to which is attached a cover plate 28 that has a nipple 29 for connection with the fuel inlet line 19. Formed within the members 27 and 28 is a motor chamber containing a rotary vane-type impeller 30, the fluid inlet side of the motor chamber being designated 31 and the outlet side 32. Secured to the inner face of side plate 23 is a member 33, which together with members 27 and 28 provides a primary fuel passage 34 extending from the nipple 29 to approximately the center of the casing and also provides a fuel by-passage 35 beneath and parallel with passage 34. Passage 35 is in open communication with chamber 32, while passage 34 opens into chamber 31 through a valve seat that is normally closed by a spring backed valve 36, as is shown in Figs. 4 and 5.

A tubular member 37 secured to side plate 24 is spaced from but aligned with member 33 so as to receive fuel exhausting from passages 34 and 35. Member 37 conducts such fluid to a nipple 38 that is secured to the outer face of plate 24 and is adapted for connection to the outlet fuel line 20.

Interposed between members 33 and 37 is a rotatable screen unit 39 that is affixed to a shaft 40 which also carries the impeller 30, the shaft being journalled in bearings 41 provided within the casing. The screen unit comprises a hub 42 and inner, intermediate and outer rings, respectively 43, 44 and 45, spaced by spokes 46. Screening 47 is extended between rings 43 and 44 and screening 48 between rings 44 and 45, the latter screening being plaited or arranged in folds as shown in Fig. 4 to increase the effective area thereof. Telescoped partially within outer ring 45 is a stationary sealing ring 49 that is carried by a partition 50, the latter being so extended across the casing interior that fuel from passages 34 and 35 can enter tubular member 37 only by passing through the mesh of screening 47, 48.

In order to prevent rotation of the screen unit 39 and impeller 30, when the valve 36 is closed, a finger 51 is extended from the valve for engaging in notches 52 formed in the periphery of the circular web of the impeller. Access to the interior of the casing for replacement of screen unit 39 is provided by a slot 53 formed in the casing section 21, this slot being closed by a band 54 held in place by removable fasteners 55. A screw cap 56 on the side plate 24 aligned with shaft 40 is removable to provide access to hub 42 which is screw threaded onto shaft 40.

In order to prevent such accumulation of vapor within unit 10 as would impair its efficiency, a vented dome 57 is provided on casing section 21. The vent from the dome, leading to a vent line 58 is closed by a spring backed vapor relief valve 59. This valve is connected to a float 60 which is pivoted at 61 to the casing, the arrangement being such that when the liquid in the dome drops below a predetermined level due to accumulation of vapor thereabove, the float lowers and thereby opens the valve to allow escape of such vapor through vent line 58.

Similarly in order to prevent accumulation of water in the unit 10 a hydrometric valve is provided in a well 62 in the casing 21 to control a passage leading to water vent line 63. This valve comprises a spring closed valve element 64 connected to a float 65 whose buoyancy in water, but not in liquid fuel, is sufficient to open the valve. Consequently when the level of water in well 62 becomes high enough to submerge the float the valve is automatically opened to allow the water to drain from the well.

In normal operation of the system, fuel entering nipple 29 and passage 34 from line 19 passes through the part of the screening 47 and 48 which overlies the end of passage 34 and thence passes into tubular part 37 from which it flows through nipple 38 into line 20 leading to the engine. During such normal operation the screening imposes little resistance to passage of fuel therethrough and hence the pressure differential between passages 34 and 35 is sufficient to open the valve 36 against the load of its spring. Accordingly there is no flow of fuel through by-passage 35; and also there is no appreciable flow of fuel in the casing outside of members 33 and 37 and around tubes 26, so that the body of fuel in the casing is nearly static and its temperature is raised substantially by the heated air from duct 11 passing through the tubes. As will be apparent to those skilled in the art, suitable control means for the heating system may be provided, to maintain this temperature at the desired degree.

Upon the accumulation of ice on the part of the screening overlying passage 34 in sufficient quantity to obstruct the direct flow of fuel from that passage into tube 37, the resulting increase of pressure in passage 34 relative to the pressure in passage 35 will open the valve 36 and allow fuel to flow through chambers 31 and 32 and thence through passage 35. Flow from the latter is unobstructed since the ice accumulation does not extend appreciably beyond the portion of the screening overlying passage 34. The flow between chambers 31 and 32 results in rotation of the impeller 30 so that the screen unit 39 is turned, clockwise in Fig. 2, to move the ice covered part of the screening into the static body of heated fuel, which acts to melt the ice, and to bring an ice-free part of the screening into overlying relation to the outlet of passage 34. Thereupon normal flow through passage 34 will be restored, valve 36 will close, and the flow acting to cause rotation of impeller 30 will cease.

As valve 36 opens, the finger 51 is lifted from the notches 52 in the impeller web, so that the aforementioned rotation of the impeller and screen unit is permitted. However as soon as the valve closes the finger acts to stop such rotation. By this arrangement the screen unit rotates only through the angle required to present an ice-free portion of the screening to the fuel passage 34, thereby providing maximum ice removal capacity for a unit of given dimensions.

It will be understood that foregoing disclosure of the ice removal unit and of the apparatus associated with it, is set forth by way of illustration and explanation of the inventive principles involved, and not by way of limitation. These principles may be employed in various other physical embodiments without departing from the spirit of the invention, or from the scope thereof as defined in the appended claims.

I claim as my invention:

1. A foreign matter removal means for a fluid system comprising a movable screen, a primary fluid fed conduit terminating adjacent a portion of said screen for directing fluid therethrough, a loaded bypass valve in said primary conduit upstream of its termination, responsive in its opening to pressure rise in said conduit occasioned by clogging of the screen portion adjacent the conduit termination, a second fluid feed conduit into which said bypass valve discharges fluid and terminating adjacent another portion of said screen but on the same side thereof for directing and delivering fluid therethrough, means to move said screen transversely relative to the discharge portions of said conduits in response to flow of fluid in said second conduit as a result of opening of said bypass valve, and a common outlet for fluid on the opposite side of said screen from said conduits to receive fluid passing through said screen from either conduit.

2. A foreign matter removal means for a fluid system comprising a movable screen, a primary fluid fed conduit terminating adjacent a portion of said screen for directing fluid therethrough, a loaded bypass valve in said primary conduit upstream of its termination, responsive in its opening to pressure rise in said conduit occasioned by clogging of the screen portion adjacent the conduit termination, a second fluid feed conduit into which said bypass valve discharges fluid and terminating adjacent another portion of said screen but on the same side thereof for directing and delivering fluid therethrough, means to move said screen transversely relative to the discharge portions of said conduits in response to flow of fluid in said second conduit as a result of opening of said bypass valve, a common outlet on the opposite side of said screen from said conduits to receive fluid passing through said screen from either conduit, a housing embracing those portions of said screen out of the paths of said first and second conduits, and means in said housing for removing foreign matter from the said screen portions.

3. A foreign matter removal means for a fluid system comprising a movable screen, a primary fluid fed conduit terminating adjacent a portion of said screen for directing fluid therethrough, a loaded bypass valve in said primary conduit upstream of its termination, responsive in its opening to pressure rise in said conduit occasioned by clogging of the screen portion adjacent the conduit termination, a second fluid feed conduit into which said bypass valve discharges fluid and terminating adjacent another portion of said screen but on the same side thereof for directing and delivering fluid therethrough, an impeller in said second conduit rotatable by flow of fluid therein, and a driving connection from said impeller to move said screen transversely relative to the discharge portions of said conduits, and a common outlet on the opposite side of said screen from said conduits to receive fluid passing through said screen from either conduit.

4. A foreign matter removal means for a fluid system comprising a movable screen, a primary fluid fed conduit terminating adjacent a portion of said screen for directing fluid therethrough, a loaded bypass valve in said primary conduit upstream of its termination, responsive in its opening to pressure rise in said conduit occasioned by clogging of the screen portion adjacent the conduit termination, a second fluid feed conduit into which said bypass valve discharges fluid and terminating adjacent another portion of said screen but on the same side thereof for directing and delivering fluid therethrough, an impeller in said second conduit rotatable by flow of fluid therein, a driving connection from said impeller to move said screen transversely relative to the discharge portions of said conduits, a common outlet on the opposite side of said screen from said conduits to receive fluid passing through said screen from either conduit, a housing embracing those portions of said screen which are out of the paths of said first and second conduits and means in said housing for removing foreign matter from the said screen portions.

ROBERT M. STEVENS.

REFERENCES CITED

The following references are of record in the file of this patent:

UNITED STATES PATENTS

| Number | Name | Date |
| --- | --- | --- |
| 1,722,808 | Manning | July 30, 1929 |
| 1,998,622 | Harrow | Apr. 23, 1935 |
| 2,057,497 | McNeal | Oct. 13, 1936 |
| 2,064,510 | Wells | Dec. 15, 1936 |
| 2,066,479 | Mac Isaac | Jan. 5, 1937 |